US010607359B2

(12) United States Patent
De Los Santos et al.

(10) Patent No.: US 10,607,359 B2
(45) Date of Patent: Mar. 31, 2020

(54) SYSTEM, METHOD, AND APPARATUS TO DETECT BIO-MECHANICAL GEOMETRY IN A SCENE USING MACHINE VISION FOR THE APPLICATION OF A VIRTUAL GONIOMETER

(71) Applicants: Richard Anthony De Los Santos, Goshen, IN (US); Krissie Marie Littman, Goshen, IN (US); Kimberly Kate Ferlic, Granger, IN (US); Randolph James Ferlic, Granger, IN (US)

(72) Inventors: Richard Anthony De Los Santos, Goshen, IN (US); Krissie Marie Littman, Goshen, IN (US); Kimberly Kate Ferlic, Granger, IN (US); Randolph James Ferlic, Granger, IN (US)

( * ) Notice: Subject to any disclaimer, the term of this patent is extended or adjusted under 35 U.S.C. 154(b) by 43 days.

(21) Appl. No.: 15/920,936

(22) Filed: Mar. 14, 2018

(65) Prior Publication Data
US 2019/0287261 A1 Sep. 19, 2019

(51) Int. Cl.
G06K 9/00 (2006.01)
G06T 7/60 (2017.01)
G06N 3/04 (2006.01)
G06N 3/08 (2006.01)
G06T 7/70 (2017.01)
G06T 7/20 (2017.01)
G06T 7/00 (2017.01)

(52) U.S. Cl.
CPC ............... *G06T 7/60* (2013.01); *G06N 3/04* (2013.01); *G06N 3/086* (2013.01); *G06T 7/20* (2013.01); *G06T 7/70* (2017.01); *G06T 7/97* (2017.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| 5,151,951 A * | 9/1992 | Ueda ................... G06K 9/4642 382/156 |
| 5,699,449 A * | 12/1997 | Javidi ................ G06K 9/00221 382/156 |
| 2015/0238148 A1* | 8/2015 | Georgescu ........... A61B 5/7267 600/408 |

* cited by examiner

Primary Examiner — Alex Kok S Liew

(57) ABSTRACT

A system, method, and apparatus to detect bio-mechanical geometry in a scene using machine vision. The invention provides accurate and dynamic data collection using machine learning and vision coupled with augmented reality to continually improve the process with each experience. It does not rely upon external sensors or manual input.

16 Claims, 4 Drawing Sheets

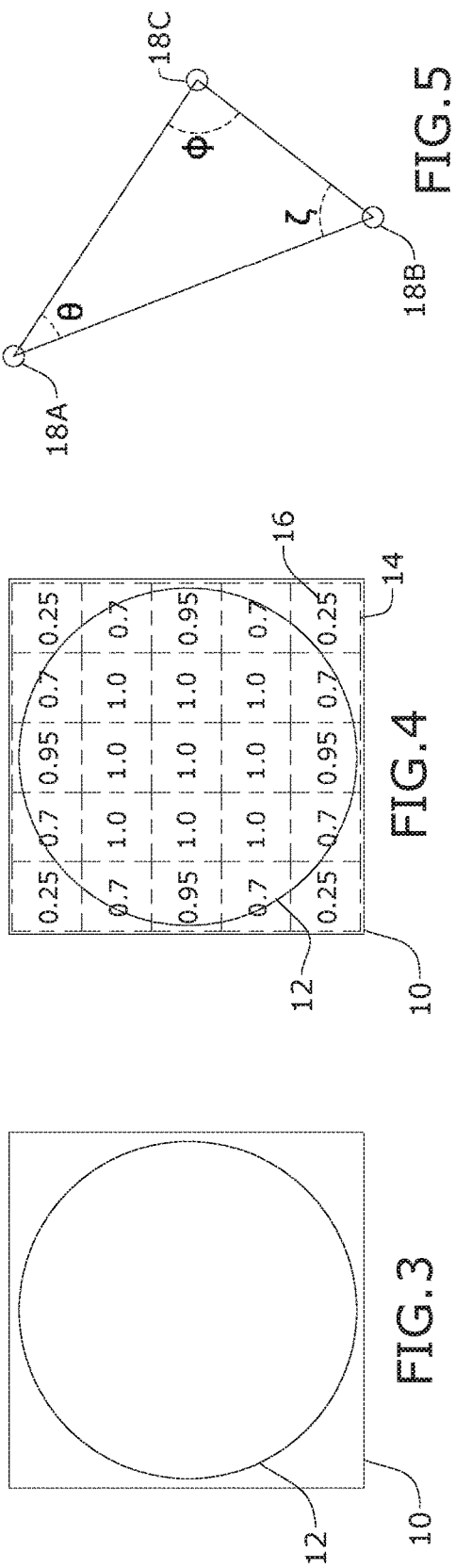

$$\begin{bmatrix} I_{1,1} \\ I_{n,s} \\ I_{N,S} \end{bmatrix} \times \begin{bmatrix} h_{1,1} & \cdots & h_{K,1} \\ \cdots & h_{k,m} & \cdots \\ h_{1,M} & \cdots & h_{K,M} \end{bmatrix} \cdot \frac{1}{1+e^{-(x+bias)}} \cdot \begin{bmatrix} H_{1,1} \\ H_{n,s} \\ H_{N,S} \end{bmatrix} \times \begin{bmatrix} o_{1,1} & \cdots & o_{G,1} \\ \cdots & o_{g,k} & \cdots \\ o_{1,K} & \cdots & o_{G,K} \end{bmatrix} \cdot \frac{1}{1+e^{-(x+bias)}}$$

$I_{n,s}$ = nth input set for scale set s, $h_{k,m}$ = connection weight for mth input and kth hidden neuron $H_{n,s}$ = nth hidden neuron set for scale set s, $o_{g,k}$ = connection weight for kth hidden neuron and gth output neuron $I_{n,s} = [i_1 ... i_M]_{n,s}$, $H_{n,s} = [h_1 ... h_K]_{n,s}$ N = # of input sets, S = # of scale sets, M = length of each input set, $I_{n,s}$ K = # of hidden neurons, G = # of output neurons

FIG. 6

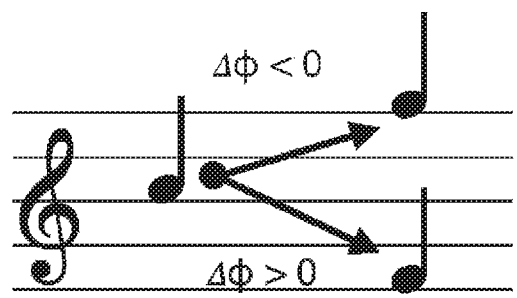
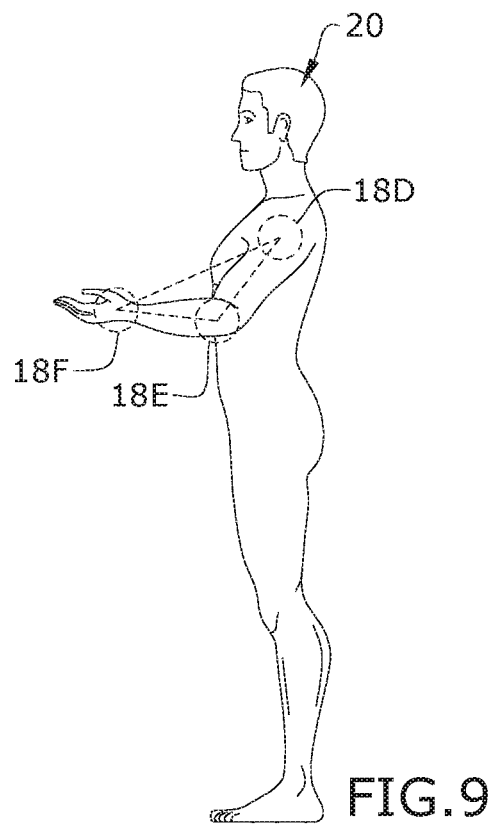
FIG.7
FIG.9
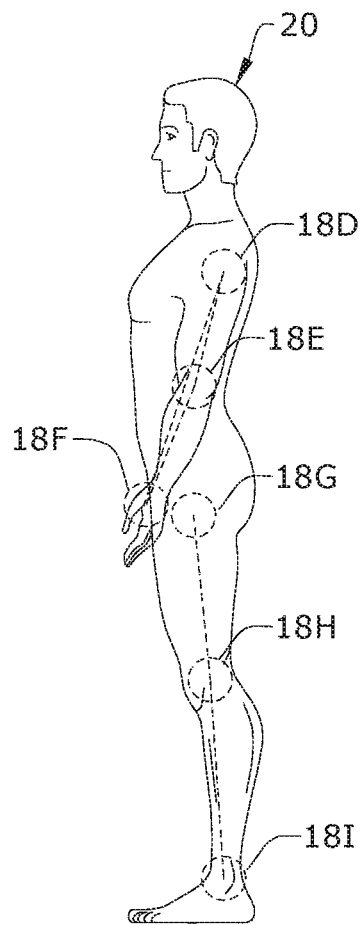
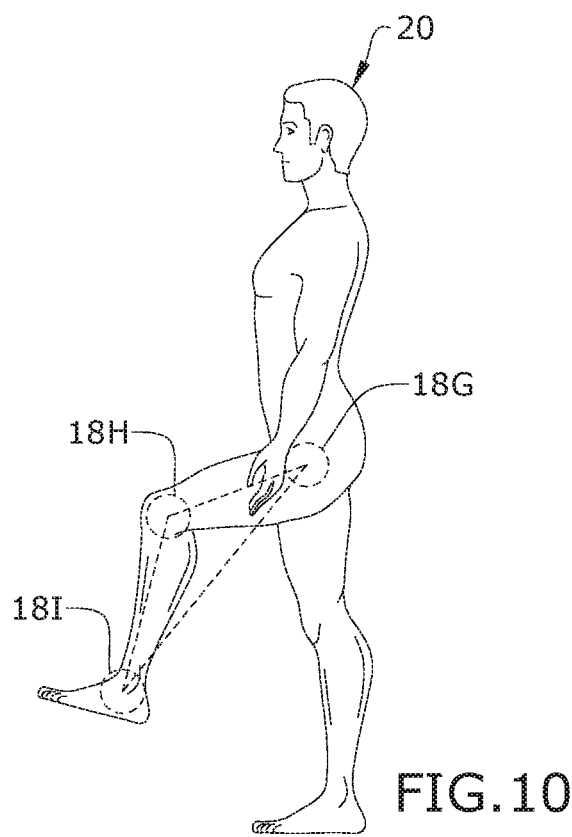
FIG.8
FIG.10

SYSTEM, METHOD, AND APPARATUS TO DETECT BIO-MECHANICAL GEOMETRY IN A SCENE USING MACHINE VISION FOR THE APPLICATION OF A VIRTUAL GONIOMETER

BACKGROUND OF THE INVENTION

The present invention relates to motion analysis and, more particularly, to systems and methods detecting and determining the movement of a target in a plurality of images.

In order to effectively assess motion in space, methods for measuring angles of static and dynamic rotation are dependent upon sensor technology as well as subjective human analysis. Current methods require tedious manual labor accompanied by human error and/or expensive equipment to make these measurements. In addition, previous solutions are subject to a need for supplementary sensors or manual measurement to facilitate data collection.

As can be seen, there is a need for an improved system, method, and apparatus that provides more accurate dynamic data collection using machine learning and vision, coupled with augmented reality.

SUMMARY OF THE INVENTION

In one aspect of the present invention, a computerized method to detect bio-mechanical geometry in a scene via an artificial neural network, is disclosed. The method includes receiving a plurality of image frames having one or more target objects captured within the plurality of image frames. The plurality of image frames are then processed through a scene processor to identify the one or more target objects within each image frame, wherein the image frame is subdivided into a plurality of sub-images based on a target scale corresponding to the one or more target objects. Each sub image is converted into a neural input set for each target scale. The neural input set for each target scale is concatenated into a single input array. The input array is then processed through a conditioned neural network to determine a values the hidden neurons and a neural network output is determined based on the hidden values. An the outputs are mapped to coordinates in the plurality of image frames. In some embodiments, a genetic algorithm is applied to an initial training set data in order to build the neural network, wherein the first gene represents the number of neurons in an input layer; a second gene represents the number of neurons in a hidden layer; and a third gene is the number of neurons in an output layer.

A neural network error correction protocol may be applied in order to refine the neural network via the initial training set. New data sets may be fed back into the neural network training data until the neural network is properly trained.

An index of the neural network output array representing the positions of one or more target objects may be mapped to the plurality of image frames. Preferably, the relative geometry of three or more target objects is determined and the relative geometry is presented on the plurality of image frames.

In yet other embodiments, a feedback signal based on the relative geometry of the one or more target objects is provided to the user. The feedback signal may be one or more of an audio, a visual, or a tactile signal.

Other aspects of the invention include, a system to detect bio-mechanical geometry in a scene, serving the purpose of a goniometer. The system includes a camera having a digital video output, a computer having a processor; and a program product comprising machine-readable program code for causing, when executed, the computer to perform the process steps. The steps include receiving a plurality of image frames from the digital video output of the camera, the plurality of image frames having one or more target objects captured within the plurality of image frames. The plurality of image frames are processed through a scene processor to identify the one or more target objects within each image frame, wherein the image frame is subdivided into a plurality of sub-images based on a target scale corresponding to the one or more target objects. Each sub image is processed into a neural input set for each target scale. The neural input set for each target scale is concatenated into a single input array. The single input array is then processed through a conditioned neural network to compute a value for hidden neuron and computing a neural network output based on the hidden values. An array index may then be mapped to coordinates in the plurality of image frames. A genetic algorithm may be applied to an initial training set data in order to build the neural network, wherein a first gene represents the number of neurons in an input layer; a second gene represents the number of neurons in a hidden layer; and a third gene is the number of neurons in an output layer.

A neural network error correction protocol may be applied to refine the neural network via the initial training set. New data sets may be fed back into the neural network training data until the neural network is properly trained. An index of the neural network output representing the position of one or more target objects may then be mapped to the plurality of image frames. The relative geometry of the one or more target objects may then be determined and presented within the plurality of image frames.

In some embodiments, a feedback signal is provided based on the relative geometry of the one or more target objects. The feedback signal may be one or more of an audio, a visual, or a tactile signal.

These and other features, aspects and advantages of the present invention will become better understood with reference to the following drawings, description and claims.

BRIEF DESCRIPTION OF THE DRAWINGS

FIG. 3 is a schematic view of the invention (Example training image.);

FIG. 4 is a schematic view of the invention (Training image converted to neural input.);

FIG. 5 is a schematic view of the invention (Example geometry from detected objects in the scene.);

FIG. 6 is an equation view of the invention (Core neural network processing calculations and definition.);

FIG. 7 is an equation view of the invention (Pitch change as a function of detected geometry angle changes);

FIG. 8 is a schematic view of the invention demonstrating exemplary subject in initial state (Example placement of objects to be detected.);

FIG. 9 is a schematic view of the invention demonstrating exemplary subject in secondary state (Example placement of objects to be detected.); and FIG. 10 is a schematic view of the invention demonstrating exemplary subject in secondary state (Example placement of objects to be detected.).

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improved system, method, and apparatus for determining the movement of reference points in a plurality of image frames. In order to effectively assess motion in space, aspects of the present invention provide accurate dynamic data collection in conjunction with machine learning and vision, to identify and determine the movement of reference points in a plurality of image frames. The artificial intelligence system continually simplifies and improves the process with each experience.

The system of the present invention may include at least one computer with a user interface and a means to access or capture digital video and images. The computer may include any computer including, but not limited to, a desktop, laptop, and smart device, such as, a tablet, smart phone, smart watch and smart glasses. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

Figure 1:
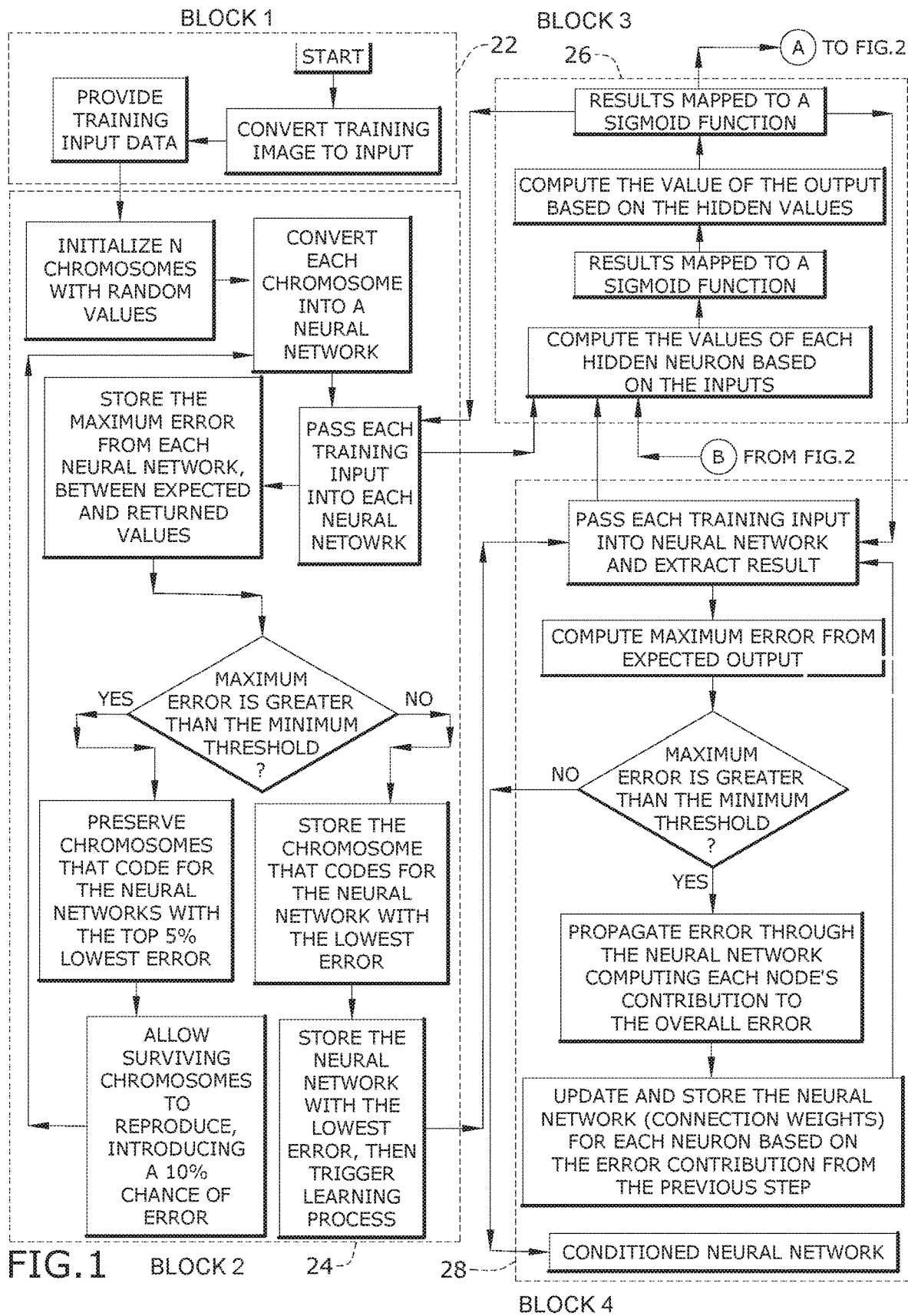
FIG. 1 is a flowchart illustrating a neural network input conversion. (Genetic algorithm. Core neural networking processing. Neural network error correction.)
Figure 2:
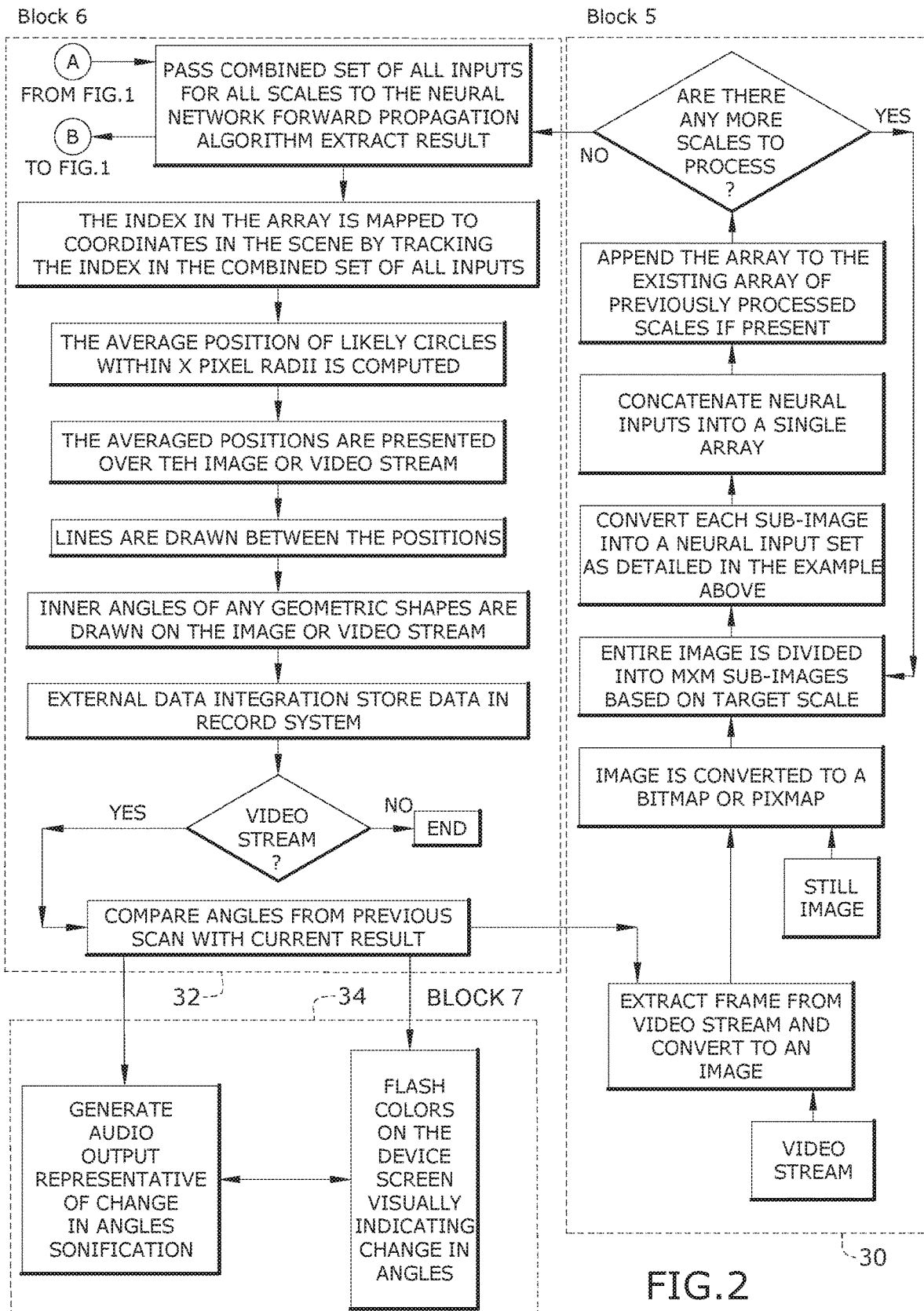
FIG. 2 is a schematic view of the invention an a continuation of FIG. 2. (Image & video scene processing. Object detection and position drawing. End user feedback.)

As seen in reference to the flowchart of FIGS. 1 and 2, the method may include seven primary components: including a neural input set 22; a genetic algorithm 24; a neural network process 26; a neural network error correction process 28; a scene processor 30; an object position designation process 32; and a detection and feedback process 34.

Block 1—Training Neural Input Set

The system learns according to a training neural input set 22. This example details the conversion of a plurality of training images into a neural input set. As seen in reference to FIG. 4, the training image 10 is taken and dissected into a plurality of smaller image segments, or pixels 14. Then, an average pixel value 16 is computed for each pixel 14. The average pixel values 16 are then placed into an array or list of numbers. From this array, a single neural input set for a training example is composed.

Block 2—Genetic Algorithm

A structurally optimized artificial neural network topology is created during the application of the genetic algorithm 24. Several hundred chromosomes are created with randomly assigned values. Each chromosome codes for a single neural network. The first three genes in each chromosome codes for the neural network structure. The first gene represents the number of neurons in the input layer. The second gene is the number of neurons in the hidden layer and is determined by a genetic algorithm process. Finally, the third gene is the number of neurons in the output layer and is dictated by the expected output. The remaining genes code for the connection weights between the neurons in the neural network.

Each training input is passed into the neural network and a value is returned. This value is compared to an expected value and an error is determined. In this process, the expected output is a single value that varies between 0 and 1. Objects that the neural network is taught to detect are assigned an output of 1. Counter examples of the objects, those not recognized as the object, are assigned an output of 0. If the maximum error is greater than a minimum threshold, the chromosomes that code for the neural network with the top 5% lowest error are preserved.

Each chromosome is converted to a neural network using the mapping described in block 1. The resulting neural networks are then tested for detection accuracy against each of the training sets using a Neural Network Process, described below, in block 3. Chromosomes coding for the top five percent performing neural networks are preserved, while the rest are discarded. The surviving chromosomes reproduce by sharing their genetic material between one another. This reproduction mimics biological sexual reproduction and uses crossover to maximize genetic variability. Other forms of genetic reproduction could also be implemented to enhance genetic diversity. In addition, each chromosome may experience up to a ten percent random chance of mutation within its genome. This process repeats until the tested neural networks result in an error below an indicated threshold. The indicated threshold may vary based on the size of the entire training ensemble.

If the maximum error is less than the minimum threshold, the chromosome that codes for the neural network with the lowest output error for all training sets is stored to become the primary detection network used by the remainder of the process. The learning process, block 4, is triggered once the primary detection network has been determined and stored.

Block 3—Neural Network Process

The neural network process 26 is essentially the engine that drives the detection of targets in the plurality of image frames using a modified forward propagation method. The method can accept any number of neural input sets and can output an array corresponding to each neural network input set indicating affirmative or negative detections of the one or more targets. The neural network process 26 is called repeatedly throughout the process.

The neural network process 26 receives an input set, which may be one or many training input or a processed extracted video frame or still image input arrays and computes the values of the hidden neurons based on the inputs according to Equation 3.1, below:

$$\begin{pmatrix} I1,1 \\ In,s \\ IN,S \end{pmatrix} \times \begin{pmatrix} h11 & \ldots & hK1 \\ \vdots & hk,m & \vdots \\ h1M & \ldots & hKM \end{pmatrix} \qquad \text{Equation 3.1}$$

Each result is mapped to a sigmoid function as shown in Equation 3.2.

$$\frac{1}{1+e^{-(x+bias)}} \qquad \text{Equation 3.2}$$

The neural network process 26 computes the values of the output array based upon the hidden values according to Equation 3.3:

$$\begin{pmatrix} H1,1 \\ Hn,s \\ HN,S \end{pmatrix} \times \begin{pmatrix} o11 & \ldots & oG1 \\ \vdots & og,k & \vdots \\ o1K & \ldots & oGK \end{pmatrix} \quad \text{Equation 3.3}$$

Each result from equation 3.3 is then mapped to a sigmoid function, as shown in reference to Equation 3.4.

$$\frac{1}{1+e^{-(x+bias)}} \quad \text{Equation 3.4}$$

where:
In, s=nth input set for scale s
hk, m=connection weight for mth input and kth hidden neuron
Hn, s=nth hidden neuron set for scale s
og, k=connection weight for kth hidden neuron and gth output neuron
In, s=[i1 ... iM]n, s
Hn, s=[h1 ... hK]n, s
N=# of input sets
S=# of scale sets
M=length of each input set, In, s
K=# of hidden neurons
G=# of output neurons Block 4—Neural Network Error Correction The neural network error correction module 28 uses a back propagation routine to condition the neural network that survived the genetic algorithm process 24. The process of conditioning passes all the training set data into the neural network processor 26, propagating the information about the resulting errors back through the neural network from the output layer up to the input layer adjusting the connection weights to reduce the resultant error. Repeating this process will reduce the overall error of the neural network until it reaches a satisfactory threshold.

Block 5—Live or Still Scene Processor

A scene processor 30 is used to analyze a plurality of still or live scene image frames that may be extracted from a video stream. The plurality of image frames are then analyzed to detect one or more trained objects within the frames. The trained objects are detected in an image or live video using the conditioned neural network generated by the neural network error correction module 28. The detection begins by extracting a video frame or still and converting it to a bitmap or pixmap. Then, the extracted image frame is evenly divided into smaller image segments based on a target scanning scale. Each of these sub images are converted to a neural input set as detailed in Block 1. Each neural input set is concatenated into a single array.

This process is repeated for every scale-sized sub image (i.e. 5%, 10%, etc.) in the image scanned to attain the total number of input sets, expressed in the following:

$$\text{Total Input Sets} = \Sigma_{s=\alpha}^{\beta} Ns$$

$$Ns = s^{-2}$$

where
Ns=# of input sets for scales
s=scale, 0.0-1.0
β=ending scale, typically the scale is stepped in increments of 0.2

The end result of each scale scan is concatenated to the previous results. This forms an output array containing a neural input set for every sub image at each scale scanned. Furthermore, if depth sensing technology is present and the detected objects exist in the same spatial plane, the background and foreground can be rejected simplifying the image and reducing visual noise.

Block 6—Object Positions

The object position and spatial relation processor 32 receives the output array from the scene processor. The output array indicates the likelihood that the respective neural input set contains the trained object. The index of each element in the output array is mapped back to the originally scanned image. The likelihood of a target object 18 being in a location varies between 0 and 1. A value above a designated threshold is considered an affirmative detection of the trained object. This will result in several points being identified near the trained object in the scanned image. The cluster of points are collapsed to a single point by finding the average position of nearby points. Lines are drawn connecting averaged positions as seen in reference FIG. 5.

As seen in reference to FIG. 5, the inner angles or other geometric information pertaining to the spatial relationships of target objects 18A-18C may be presented in a diagram and may be overlaid on the scanned image or live video stream. In addition, the data for each output can be stored in an external data system for review and analysis. If the input is a live video stream, the process repeats as fast as the device can handle the processing of each extracted video frame. Successful and unsuccessful detections of the targets 18A-18C can be used as ongoing training data for an improved neural network using the process defined in Blocks 1-4.

Block 7—Feedback

A feedback module 34 may also be included to provide visual, auditory, and tactile feedback of the target positions and may be presented to end users along with the geometric representation provided by the spatial relation processor 32. By using the computed geometry and associated representations, an expert or another artificial neural network can make a conclusion based upon the diagnostic data.

The feedback module 34 may include an auditory feedback signal, such as an emitted tone with a pitch proportional to the change in the determined angles of the geometric represented shape, as shown in reference to FIG. 7. The auditory feedback may be represented in the following equations. For example, as the inner angle decreases, the pitch increases: $\Delta\varphi<0$, increases pitch. Alternatively, as the inner angle increases, the pitch decreases: $\Delta\varphi>0$, decreases pitch. We call this process sonification. The sonification of the feedback signal may be represented according to the following equations:

$$\Delta\lambda = -\sigma \frac{\partial \varphi}{\partial t}$$

where:
$\Delta\lambda$=change in pitch
$\lambda$=pitch
$\sigma$=parameterized scaling factor Similarly, a visual feedback signal may be indicated using emitted colors, for example, starting with red and moving to blue in proportion to the change in the angle, or a flashing light signal. Likewise, a tactile feedback indicating a change in angular movement may also be presented by a vibratory signal. As the angle decreases, the tactile feedback device may vibrate at a higher frequency and/or amplitude. The rate of change in the vibratory signal may be proportional to the rate of change of the angle for all the feedback methods. As a result, high and immediate, quality feedback is provided to end users.

In operation, the process applies the genetic algorithm 24 to the initial training set data 22 in order to build a neural network. This will produce a basic neural network topology, which is the number of layers and nodes along with corresponding connection weights. Application of a learning protocol 28 refines this neural network via the training set into a functional state. The learning protocol refines the neural network until it becomes properly conditioned.

Applying the conditioned neural network to new data sets computes the relative geometry of the target bio-mechanical system. The geometry may be represented by one or more of an audio, a visual and a tactile cue. By using the computed geometry and associated representations, an expert or another artificial neural network can make a conclusion based upon the diagnostic data.

The system could be used in a variety of settings to provide a low cost, intuitive, user friendly mechanism in order to assess geometric angles. By way of non-limiting example, the system would allow individuals to measure, record and assess their progress on an independent basis while recovering from an orthopedic injury or procedure. In this capacity it will functional as a virtual goniometer. Patients and therapists can use Time Evolution Analysis (TEA) to determine progress. This is the process of compiling data sets from 2 or more sessions into a single visual, auditory, and tactile representation.

As seen in reference to FIGS. 8-10, a plurality of targets 18D-18I may be applied at various joints of the orthopedic patient 20. The patient 20 may be recorded or filmed by one or more video cameras to capture images of the position of the patient 20 as the patient 20 performs various range of motion exercises. For example, as the patient 20 moves their arm in an upward movement the video camera captures the position of the shoulder target 18D, the elbow target 18E, and the wrist target 18F in a plurality of image frames. The image frames of the patient's movements are input to the scene processor 30 to detect the plurality of targets 18 in the image frames and produce a plurality of inputs for the spatial relation processor 32. The spatial relation processor 32 may then present the information visually on a display for the therapist or the patient to view and determine a range of motion for the affected arm and otherwise assess the patient's performance and progress.

Likewise, as shown in reference to FIG. 10, the patient 20 may also move a leg to determine a range of motion. As the patient 20 moves their leg in an upward movement the video camera captures the position of the hip target 18G, the knee target 18H, and the ankle target 18I in a plurality of image frames. The image frames of the patient's leg movements are input to the live or still scene processor 30 to detect the plurality of targets 18G-18I in the image frames and produce a plurality of inputs for the spatial relation processor 32. The spatial relation processor 32 may then present the information visually on a display for the therapist or the patient to view and determine a range of motion for the affected leg. As will be appreciated, the range of motion data for the patient 20 may be stored in the system to track and monitor the patient's progress during their rehabilitation.

In certain embodiments, the system may also be utilized by the patient 20 individually to continue their physical therapy between assessment and progress visits with their physical therapist. Because the plotted visual representation of the patient's range of motion may be difficult to view during the performance of certain exercises, the system may be configured with the feedback module 34 to provide the patient 20 instantaneous feedback of their performance during their exercise regimen. The feedback module 34 may be programmed to accept a specified goal for the patient to attain. The feedback module 34 may signal the patient 20 during their performance of the exercise and may also signal the patient 20 when they have attained the specified goal.

As will be appreciated, the system may also be configured to conduct proper body mechanics assessments in factory settings for employee safety and education programs. Additionally, the system, method, and apparatus may be applied to one or more of the following: 1) sports/training; 2) medicine; 3) medical diagnostics; 4) veterinarian diagnostics; 5) physical/occupational therapy; 6) insurance companies; 7) education/math; 8) field tech work/auto repairs, etc.; 9) equestrian; 10) models/beauty pageants; 11) plastic surgery/geometric alignment; 12) eye glasses/fashion.

The system may thus be utilized to provide an objective measure of the bio-mechanical geometry of a patient, athlete, model, animals, etc. It may also be implemented in a variety of apps such as an education app which allows students to learn about shapes and geometry. A choreography app may provide instruction and feedback to assist dancers in learning a dance routine and/or maintaining proper form during the dance. An athletics app may be utilized to assess performance in any number of athletic endeavors. For example, it may evaluate football player's form for performance and rehabilitation following an injury.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail.

It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A computerized method to detect bio-mechanical geometry in a scene via an artificial neural network, comprising:
   receiving a plurality of image frames having one or more target objects captured within the plurality of image frames;
   processing the plurality of image frames through a scene processor to identify the one or more target objects within each image frame, wherein the image frame is subdivided into a plurality of sub-images based on a target scale corresponding to the one or more target objects;
   converting each sub image into a neural input set for each target scale, concatenating the neural input set for each target scale into a single input array;
   processing the single input array through a conditioned neural network to compute a value for hidden neuron and computing a neural network output based on the hidden values, further comprising: applying a genetic algorithm to an initial training set data in order to build the neural network, wherein a first gene represents the number of neurons in an input layer: a second gene represents the number of neurons in a hidden layer; and a third gene is the number of neurons in an output layer, wherein applying the conditioned neural network to new data sets for computing the bio-mechanical geometry.

2. The computerized method of claim 1, further comprising:
   mapping an array index to coordinates in the plurality of image frames.

3. The computerized method of claim 1, further comprising:
   applying a neural network error correction protocol to refine the neural network via the initial training set.

4. The computerized method of claim 3, further comprising:
   generating new data sets fed back into the neural network training data until the neural network is properly trained.

5. The computerized method of claim 4, further comprising:
   mapping an index of the neural network output representing the position of the one or more target objects to the plurality of image frames.

6. The computerized method of claim 5, further comprising:
   computes the relative geometry of the one or more target objects; and
   presenting the relative geometry on the plurality of image frames.

7. The computerized method of claim 6, further comprising:
   providing feedback signal based on the relative geometry of the one or more target objects.

8. The computerized method of claim 7, wherein the feedback signal is one or more of an audio, a visual, or a tactile signal.

9. A system to detect bio-mechanical geometry in a scene, comprising: a camera having a digital video output; a computer having a user interface; and a program product comprising machine-readable program code for causing, when executed, the computer to perform the following process steps:
   receiving a plurality of image frames from the digital video output of the camera, the plurality of image frames having one or more target objects captured within the plurality of image frames;
   processing the plurality of image frames through a scene processor to identify the one or more target objects within each image frame, wherein the image frame is subdivided into a plurality of sub-images based on a target scale corresponding to the one or more target objects;
   converting each sub image into a neural input set for each target scale,
   concatenating the neural input set for each target scale into a single input array;
   processing the single input array through a conditioned neural network to compute a value for hidden neuron and computing a neural network output based on the hidden values, further comprising: applying a genetic algorithm to an initial training set data in order to build the neural network, wherein a first gene represents the number of neurons in an input layer: a second gene represents the number of neurons in a hidden layer; and a third gene is the number of neurons in an output layer, wherein applying the conditioned neural network to new data sets for computing the bio-mechanical geometry.

10. The system of claim 9, further comprising:
    mapping an array index to coordinates in the plurality of image frames.

11. The system of claim 9, further comprising: applying a neural network error correction protocol to refine the neural network via the initial training set.

12. The system of claim 11, further comprising: generating new data sets fed back into the neural network training data until the neural network is properly trained.

13. The system of claim 12, further comprising:
    mapping an index of the neural network output representing the position of the one or more target objects to the plurality of image frames.

14. The system of claim 13, further comprising:
    determining the relative geometry of the one or more target objects; and
    presenting the relative geometry on the plurality of image frames.

15. The system of claim 14, further comprising:
    providing feedback signal based on the relative geometry of the one or more target objects.

16. The system of claim 15, wherein the feedback signal is one or more of an audio, a visual, or a tactile signal.

* * * * *